United States Patent [19]
Kleissler, Jr.

[11] 3,736,728
[45] June 5, 1973

[54] WASTE MATERIAL SEPARATOR AND COLLECTOR

[75] Inventor: Edwin A. Kleissler, Jr., Edison, N.J.

[73] Assignee: G. A. Kleissler Company, Edison, N.J.

[22] Filed: Aug. 3, 1970

[21] Appl. No.: 60,307

[52] U.S. Cl. ..................................... 55/341, 55/429
[51] Int. Cl. ............................................. B01d 46/04
[58] Field of Search ....................... 55/341, 429, 302

[56] References Cited
UNITED STATES PATENTS

| | | | |
|---|---|---|---|
| 1,743,050 | 1/1930 | Straus | 55/341 X |
| 3,373,545 | 3/1968 | Christianson | 55/341 X |
| 3,396,516 | 8/1968 | Ballard | 55/341 X |
| 3,520,109 | 7/1970 | Caskey | 55/341 X |
| 3,630,005 | 12/1971 | Reinauer | 55/302 |

*Primary Examiner*—Robert L. Lindsay, Jr.
*Attorney*—Cifelli and Behr, Thomas Cifelli, William E. Hedges and Omri M. Behr

[57] ABSTRACT

An enclosure is provided having a substantially horizontal, centrally disposed partition plate or member for dividing the interior volumn thereof into an upper plenum chamber and a lower collecting bin or chamber. Interiorly of the plenum chamber are fixedly supported one or more vertically oriented, tapered, tubular shaped, filter screen elements each one of which communicates at its upper end with an intake duct through a port or opening in the upper wall member of the enclosure, and communicates at its lower end with the collecting bin through an aperture in the partition plate or member. A mixture of waste materials and dust impregnated air or gas is delivered into the enclosure through the intake ducts whereupon the dusty air passes laterally through the mesh of the screen elements and into the surrounding plenum chamber. The escaping dust laden air is then exhausted to the outside through an exhaust fan and duct means. The larger pieces of waste material, however, are constrained or trapped by the screen elements and under the force of gravity settle or fall downwardly through the openings in the partition plate whereupon they are deposited in the collection bin. In an alternate preferred form of the invention, means are provided in lieu of the collecting bin for directly conveying the separated waste materials to a machine for utilization therein.

16 Claims, 3 Drawing Figures

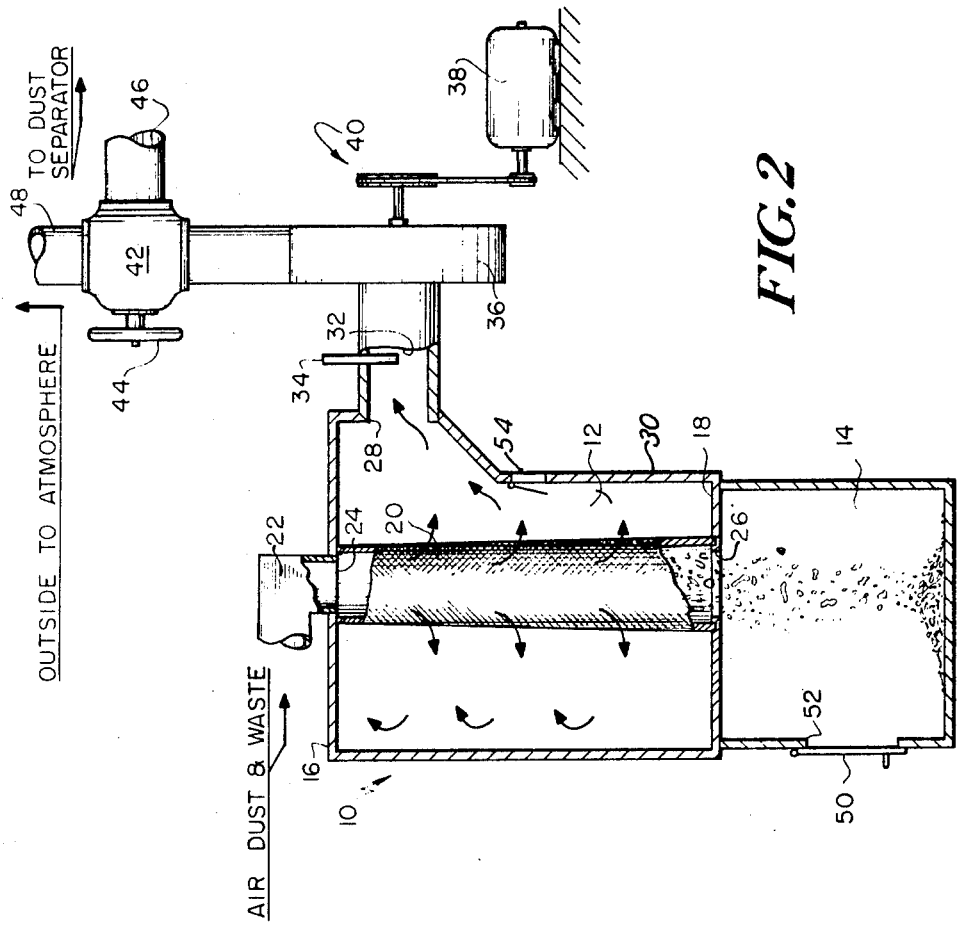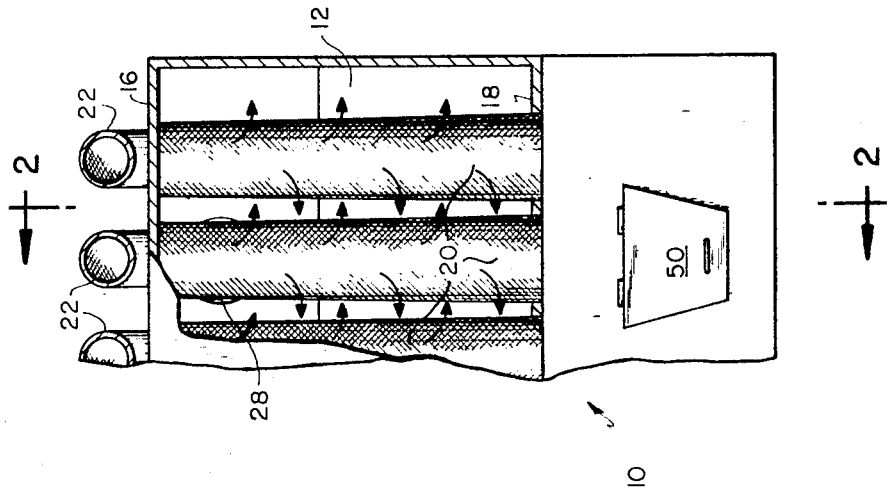

WASTE MATERIAL SEPARATOR AND COLLECTOR

BRIEF SUMMARY OF THE INVENTION

The present invention relates generally to separating and collecting devices and more particularly, to an apparatus for treating dust impregnated air or gas having additionally suspended or mixed therein larger articles of waste or scrap material wherein said waste material may be completely and efficiently separated from said dust laden air stream and deposited in a collection bin or hopper.

In certain industrial applications as by way of example in paper-making mills wherein tissue, toweling, or similar light weight papers are fabricated, or in mills where light weight plastics and the like are manufactured, it is standard procedure to cut or trim the end product into exact width sheets or rolls. This process, however, usually generates a significant amount of waste material, typically in the form of small and/or light bits and pieces of streamer, trim, scrap, etc. Other sources of similar waste material include conventional grinders and hoggers. For reasons of economy, it is desirable to attempt to reclaim the waste material or scrap and return it to the paper making process or in the alternative, to merely dispose of it. One convenient method for accomplishing these objectives is to employ an air system to draw off the waste from, say, a rewinding or trimming station, and to transport it via a moving air stream to and through a receiving bin or hopper wherein means are provided for separating and collecting the bits and pieces of material. Unfortunately, however, it has been found that most air systems draw the scrap material through a fan or blower means which, in turn, tends to mutilate or damage the material. As a result, a large quantity of dust is generated which impregnates the air stream and is delivered along with the waste material into the receiver's intake duct or port. Thus, the receiver must contend not only with an air stream carrying waste materials, but one that is impregnated or laden with dust as well.

Heretofore, two types of receiver systems have been employed to separate the waste material from the air stream, namely, the so called "cyclone" separator and the simple screen box separator placed over the collecting bin. Each, however, has its noted disadvantages due mainly to the fact that the different problems and requirements raised by the several components being fed into the receiver, that is, the waste material, dust and air, have not been truly appreciated.

For example, the conventional cyclone type separator fails to take into consideration the dust component in the air stream and in this regard it has been found inadequate in removing the dust from the air stream. Since the dusty air stream raises serious fire and health hazards, additional provision must be made in connection with the cyclone to either: (1) exhaust the dusty air stream to the outside atmosphere or (2) treat the air stream in a secondary cleaner to remove the dust therefrom. The first mentioned alternative is prohibitively expensive inasmuch as the air stream draws on air that is usually either heated or conditioned; while the latter alternative is relatively ineffectual due to the fact that the cyclone separator fails to completely filter out the scrap material with the result that small amounts thereof consistently escape from the top of the cycle carried by or in the dust laden air stream. This small amount of escaping waste material is sufficient to almost certainly cause clogging of conventional dust separators. In addition, because of the inherent nature of the cyclone action, the material rides on the inside surface of the separator wherein it rather easily tends to "ball-up" or clog. When this happens, the cyclone action becomes even more inefficient and most of the waste material leaves through the top instead of falling out through the bottom into a bin or hopper. Also, if moisture is allowed to condense on the interior surface of the cyclone walls, the probability of clogging rises sharply.

In view of its many disadvantages therefore, it is of no little surprise that cyclone separators have proven to be generally unsuccessful and accordingly, many mill installations have resorted to the use of a relatively inexpensive substitute, namely, a simple screen box placed over the receiver bin or hopper to trap and collect the scrap material. Here too, however, the dust is allowed to escape into the surrounding area and in this regard, the simple screen box suffers from the same disadvantages discussed hereinabove relative to the cyclone separator. In addition, the geometry of the simple screen box does not provide sufficient enough exit area to allow the air stream to exit at a greatly reduced velocity. Accordingly, the relatively high velocity air stream cannot dissipate its energy and thus tends to "plaster" the scrap against the screen causing eventual clogging and reduced effectiveness. It is evident, therefore, that the use of a simple screen box has failed to overcome many of the disadvantages inherent in prior art waste material separators and collectors.

Against this background and according to the present invention, an improved means is contemplated herein for efficiently separating and collecting bits or pieces of waste material from a dust impregnated stream of air or gas containing such material whereby the latter may be conveniently reutilized and said dust impregnated air stream may be effectively treated in a secondary cleaner or otherwise disposed of.

Briefly described, one embodiment of the present invention comprises in its preferred form, a casing or enclosure including an upper plenum chamber and a lower receiving bin or chamber. The upper plenum chamber further includes a plurality of vertically arranged, spaced apart, tubular shaped filter screens or elements, each one of which is adapted to communicate at the upper end thereof with an intake port or knock-out box and at the lower end thereof with the receiving bin. The tubular filter screens are slightly tapered; the diameter of the screen being somewhat greater at the lower end than at the upper end, thus effectively gradually increasing the screen area from top to bottom. As the incoming waste, dust, and air mixture enters through each intake port or knock-out box and passes downwardly, the velocity of the stream is diminished as dust-laden air passes laterally through the screen elements and into the surrounding plenum chamber. An ever increasing reduction in the velocity of the stream occurs as it flows downwardly in the filter element due to the gradually increasing diameter of the filter element and area of the screen which permits more air to flow laterally out of the filter. This reduction in the velocity of the stream due to the fact that the volume of the filter screens is greater than that of the inlet port or knock-out box, facilitates gravity separation of the waste from the dust-laden air stream. Thus dust-laden air which escapes through the screen elements is subsequently exhausted from the plenum chamber through an exhaust means cooperating therewith. At the same time, however, the bits and pieces of waste material are trapped within the individual tubular screen elements and under the force of gravity merely fall downwardly into the collecting bin. Since the exhausted dust laden air is now completely freed from all waste particles large enough to be trapped by the screen elements' mesh, it may thus be directed to a dust separator and collector for treatment therein. In an alternative preferred embodiment of the invention, a duct or chute means is provided in lieu of the collecting bin for conveying the waste materials directly to a machine for utilization therein e.g., in a paper-making mill, such machine may comprise a pulper or beater.

Thus, it is a broad object of the present invention to provide an improved means for separating waste materials or scrap from dust laden air with which it has been mixed thereby the separated waste material may be completely collected and/or reutilized and the dust laden air so freed from such material may be subsequently processed in a dust separator and collector or otherwise suitably disposed of.

It is another object of the present invention to provide a waste material separator and collector which is of relatively rugged yet inexpensive construction, is impervious to clogging and the effects of moisture, and includes means for insuring a neutral passage in the apparatus, i.e. to insure that the volumes of air entering and leaving the apparatus are equal at all times.

These and additional objects and advantages as well as a complete and thorough understanding of the present invention will be made apparent from a study of the following detailed description of the invention in connection with the accompanying drawings.

BRIEF DESCRIPTION OF DRAWINGS

FIG. 1 is a side elevation view partly broken away showing a first preferred embodiment of the present invention;

FIG. 2 is a sectional view substantially taken along line 2—2 of FIG. 1;

DETAILED DESCRIPTION OF INVENTION

Figure 3:
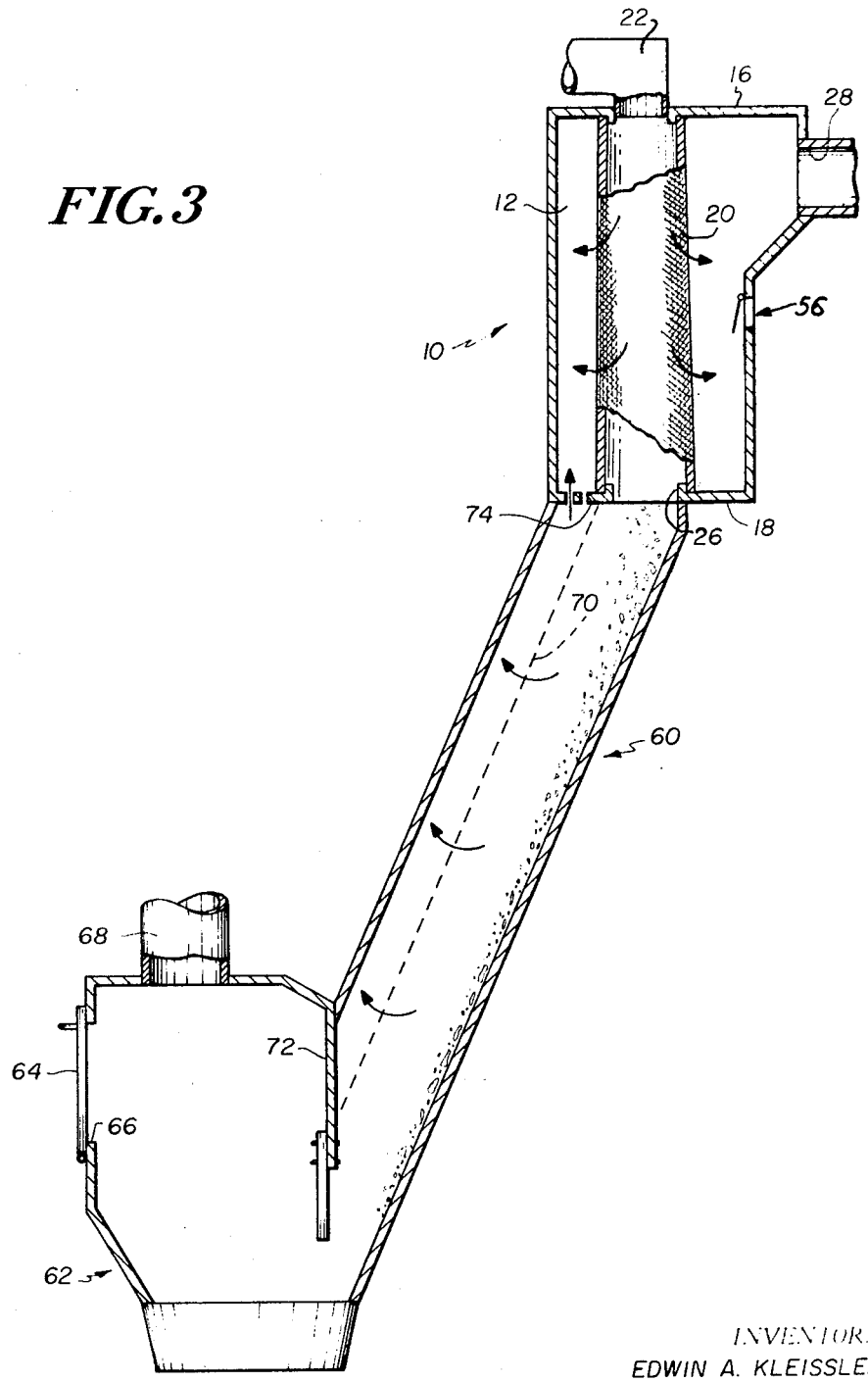
FIG. 3 is a front elevation in section showing an alternate preferred embodiment of the present invention.

Turning now to FIGS. 1 and 2, there is shown one preferred form of the invention comprising generally a casing or enclosure 10, the interior of which is divided into an upper chamber portion or plenum 12 for receiving dust laden air and a lower collection chamber or bin 14 for receiving waste materials or scrap.

Chamber 12 which is defined by an upper enclosure wall member 16 and a substantially horizontal, fixedly supported lower partition plate or member 18 spaced therefrom and located substantially intermediately of said casing as shown, includes disposed therein one or more vertically arranged, spaced apart filter screen elements 20 each one of which is fixedly supported by suitable means between said upper enclosure wall member and said partition plate and around which said plenum chamber completely extends in a substantially air tight manner. The filter screen elements, which for purposes of illustration herein have a tubular shape, but may have any convenient cross-sectional shape including square or rectangular for example, communicate at their respective upper ends with an input duct or knock-out box 22 through a respective opening or port 24 in the upper wall member 16 and at their respective lower ends with the collection chamber 14 through a corresponding series of openings 26 in the lower partition plate member 18. By this arrangement, each tubular screen element provides a conduit means for carrying the waste materials delivered thereto by and through intake duct or knock-out box 22 directly to the collecting bin 14.

Chamber 12 also includes an opening or port 28 in side wall 30 for communicating with an exhaust duct 32 having an adjustable damper plate 34 or equivalent means therein for regulating flow therethrough as will be more fully explained below. Exhaust port 32 is coupled to the input side of a fan or blower unit 34 which, in turn, is adapted to be driven by an electric motor 38 or the like through suitable power transmission means, such as the pully mechanism, for example, illustrated generally by reference numeral 40. The output of exhaust fan 36 is coupled to a two-way branch coupling 42 having a valve means 44 for directing the exhaust into either one or the other of two exhaust ducts 46 or 48. As will be explained in more detail below, exhaust duct 48 may lead to the outside atmosphere whereas exhaust duct 46 preferably leads to a conventional dust separator and collector unit.

Chamber 12 also includes, in a side wall thereof below the exit port 28, a damper means 54 to permit outside air to enter if for any reason the volume of air exiting the plenum chamber should temporarily exceed the volume of air entering through duct 22, thus preventing the flow of air into the plenum chamber from the collecting bin 14.

It should be noted that the knock-out box 22 has an angular construction rather than a radial curve. A smoothly curved construction might permit change of direction of the flow stream without substantial separation of entrained waste, whereas the angular construction produces an impact on change of direction of flow which tends to separate the the entrained waste.

Collection bin 14 includes a hinged door or similar means 50 operable for gaining access to the interior of the bin through opening 52 as when accumulation of waste material or scrap are to be removed therefrom.

In the operation of the embodiment of FIGS. 1 and 2, dust laden air or other gas which may have mixed or suspended therein bits and pieces of waste material, scrap or the like, is drawn from a plurality of selected locations outside of and beyond casing 10 by suitable blower means (not shown) and is delivered into the upper portion of plenum chamber 12 through the intake ducts or knock-out box 22 and the corresponding openings 24 in upper wall member 16. Since the total area of the screens in the filter tubes is substantially greater than the sum of the cross-sectional areas of the intake ducts 22, the velocity of the incoming air is significantly reduced immediately upon entering the upper portion of the filter tubes. As noted previously the filter tubes being tapered and increasing in diameter and cross sectional area from top to bottom, the rate of flow of the stream continues to diminish as it proceeds downwardly, thus increasing the influence of gravity on the entrained waste. Nonetheless, the air streams retain sufficient velocity within the filter tubes to define a general flow pattern characterized by a gentle current of dusty air being directed in a substantially downward and diverging outward direction relative to the central longitudinal axis of each tubular screen element. In addition, by locating the exhaust port 28 near the upper wall member 16 as shown in FIG. 2, the dusty air may be made to turn upwardly at the bottom of plenum chamber 12 and to eventually flow out of the enclosure through exhaust port 28 by the operation of exhaust fan 36. All of the while, the waste material or scrap is constrained by the mesh of the individual screen elements and consequently remains trapped within the interior volume of each element respectively. Since, as mentioned the velocity of the air within the filter tubes is relatively low and progressively decreases, the suspend waste materials under the influence of the force of gravity, gently fall or settle downwardly, passing through the individual screen element interiors, the openings 26 in partition member 18, and finally into the collecting bin 14.

It will thus be appreciated that only the dust laden air or gas escapes into the plenum chamber 12 surrounding the screen elements from which it is drawn off by the action of exhaust fan means 36 and exhaust duct 32. In this connection it may be noted that differences in size or weight of the waste material may be taken into account and suitable adjustment made therefor by adjusting the position of damper plate 34 in exhaust duct 32. Thus, for example, if the waste material comprises relatively large, heavy pieces greater suction or negative pressure may be tolerated at the exhaust port 28 since the resulting increase in velocity of the dusty air through the plenum chamber 12 will not be effective to prevent the material from overcoming the force of gravity thereby "hanging up" the material within the interior portions of the screen elements. In this case, therefore, the damper plate 34 would be withdrawn from the duct 32 until an optimum rate of flow therethrough is achieved. On the other hand, in the situation where smaller, lighter weight pieces of scrap are being fed into the separator 10 through the intake ducts 22, it is recommended that damper plate 34 be inserted further into duct 32 to decrease the volume of air flowing therethrough. This, in turn, will lower the velocity of airflow within the plenum chamber 12 and more readily permit the lighter waste materials to settle down through the several screen elements and into the collection bin 14.

One of the primary advantages of the present invention is that the dust laden air being exhausted through duct 32 is totally and entirely free of all waste or scrap materials. Thus, it is entirely feasible and indeed preferable, to direct this dusty air stream to the input duct of a conventional dust collector and separator wherein the dust may be effectively removed from the air stream and the treated, purified air returned to the location from whence it came or to an otherwise suitable location. A typical dust separator and collector suitable for this purpose is fully disclosed in U.S. Pat. No. 3,395,519, entitled "Dust Separator and Collector" by A. J. Kleissler and assigned to the assignee of the present invention. When using the prior art dust separator in conjunction with the present invention, it is merely necessary to couple the output duct 46 of two-branch coupling (FIG. 2) to the input port 16 shown in FIG. 1 of the aforementioned patent. Valve 44 will then be positioned to assure that the entire flow of dust laden air being emitted by fan unit 36 is directed into and through duct 46.

Of course, it will be understood that use of a dust separator and collector with the present invention is not requisite, and that, if desired, duct 46 may conveniently be adapted to carry the dusty air stream directly to the outside atmosphere or to dispose of it in any obvious or otherwise suitable manner. In the event a dust separator and collector is used, however, it may sometimes be required to alternatively dispose of the dusty air stream, as, for example, when said dust separator is being cycled down for repairs. When this is the case, valve 44 is merely rotated to its other extreme position and the dust laden air stream is accordingly redirected to and through duct 48 of two-branch coupling 42 whereby it may for brief periods be directed to, say, the outside atmosphere.

In some applications of the present invention instead of merely collecting the separated waste materials in a bin it may be desirable to convey such separated waste materials directly to a machine for reutilization therein as, for example, in a paper mill where it would preferable to return the collected scrap to a pulper or beating machine. Accordingly, reference is now made to the modified embodiment of FIG. 3 wherein like reference numerals represent similar parts. As in the preferred embodiment of FIGS. 1 and 2, the alternate preferred embodiment comprises an enclosure or casing having an upper plenum or chamber 12 defined by an upper enclosure wall member 16 and a lower partition or plate member 18. The chamber 12 has disposed therein one or more spaced apart, tapered, vertically arranged tubular filter screen elements 20 fixedly supported between the upper enclosure wall member and the lower partition plate. Each screen element communicates at its upper end with an intake duct or knock-out box 22 through an opening or port 24 in the upper enclosure wall member and has its lower end in registry with a port 26 in the lower partition or plate member 18. However, in the case of FIG. 3, openings 26 communicate directly with a chute or duct means indicated generally by reference numeral 60 and extending downwardly and at an angle away from the upper plenum chamber substantially as shown. Chute means 60 terminates integrally with the feed hopper section 62 of a conventional paper pulping machine which hopper further includes an access door 64 for feeding bulk material to the pulper through access opening 66. Hopper 62 also includes an exhaust port or duct 68 for exhausting steam from the pulping machine as is well known in the art. A damper 56, similar to damper 54, is included in the wall of the pleanum chamber 12 for the same reasons as damper 54 in the other embodiment. An optional, auxilliary or secondary screen element 70 which may comprise a flat planar screen having the same gauge mesh as that corresponding to tubular elements 20, is disposed within chute 60 substantially as shown and is fixedly supported therein as by attaching its upper end to the lower surface of partition plate 18 and its lower end to a downwardly extending baffle plate 72 in any suitable manner. It will be appreciated that the screen element 70, extends entirely across the transverse dimension of chute 60, that is, the dimension extending into the plane of the paper as viewed in FIG. 3 and therefore substantially increases the filter or screening area of the apparatus. When a screen 70 is employed an opening is provided in plate 74 adjacent the upper end of the screen.

Thus, in the operation of the embodiment of FIG. 3, a mixture of dust laden air and waste materials or scrap is delivered to casing 10 and enters thereinto through the intake ducts or knock-out boxes and the series of openings 24 in the upper enclosure wall member 16. As before, the dusty air escapes through the tubular screen elements 20 into the plenum chamber 12 and is drawn off through exhaust duct 28 by the action of exhaust fan 36. The waste materials however, under the force of gravity enter chute 60 through openings in partition member 18 and continue to fall downwardly through and along the interior of the chute whereupon they are directly deposited into the pulping machine via hopper means 62. If, optional screen element 70 is employed, any dust which happens to escape into the chute is drawn off through that screen and travels upwardly through a grate or similar aperture means 74 provided in partition plate 18 for this purpose, and then into the plenum chamber 12 wherein it eventually exhausts through duct 28. It may be noted that the downwardly extending baffle plate 72 includes a vertically adjustable extension or plate member for varying the size of the opening bridging the terminus of chute 60 and the hopper means 62. Thus, the pressure drop across this opening may be varied to prevent material in the pulping machine from backing up into the separator or to prevent excessive steam or moisture from entering same. In any event, if some steam or moisture should back up into the separator and condense on the surface of the screen elements, it will not ordinarily effect the operation of the apparatus since the waste materials do not normally contact the screen elements.

Thus, with respect to the modified form of the invention shown in FIG. 3, all the advantages referred to with respect to the embodiment of FIGS. 1 and 2, will also be attained.

The tubular filter elements employed in this invention are preferably tapered, as described above, so that the diameter varies about 3 inches to 4 inches in 10 feet, although lesser or greater degrees of taper may be employed. The tubular filter elements should also be electrically grounded to prevent accumulation of static electricity which can adversely affect separation of the waste.

The dampers 54 and 56 are essential to proper operation of the invention in the event air exiting from the apparatus should temporarily exceed in volume the air entering the apparatus. This could occur, for example, if one of several fans feeding air into the duct 22 should stop or go off line temporarily, thus reducing the air input. If this should occur without dampers 54 and 56, the volume of air exiting would exceed the volume of air entering the apparatus causing a drop in air pressure in the plenum chamber 12, which would result in air flowing into the chamber 12, from bin 14, thus interfering with settling of the waste entering bin 14.

In view of the foregoing, it will also be appreciated that the present invention relates to an improved means for completely and efficiently removing waste material from a stream of dust laden air or other gas, and although preferred embodiments thereof have been disclosed herein as required by statute, various alterations and modifications may be made without departing from the spirit or scope of the invention. For example, additional access doors may be provided in the upper portion of the enclosure to provide access therein for changing, cleaning, or repairing the individual tubular screen elements. Similarly, in connection with the embodiment of FIG. 3 an air slide or similar means may be employed to force a gentle stream of air into the chute to compensate for extreme chute or hopper pitches wherein the waste materials or scrap tend to pile up and accumulate within the chute interior. Many other modifications will obviously occur to those skilled in the art.

I claim:

1. Apparatus for treating a mixture of waste materials and air or other gas comprising:
    an upper chamber;
    gas permeable means disposed within said upper chamber for separating said waste material from said air or other gas;
    an inlet in the upper portion of the upper chamber for delivering said mixture into said separating means;
    an outlet in said upper chamber for said air or other gas;
    exhaust means operatively associated with said outlet of said upper chamber to draw said air or other gas from said upper chamber;
    a lower chamber communicating with said separating means in said upper chamber to collect said separated waste material;
    a partition separating said upper and lower chamber;
    pressure actuated damper means in said upper chamber responsive to pressure in the chamber and operative to permit entry of outside air or gas to maintain the pressure of said upper chamber to prevent flow from said lower chamber to said upper chamber.

2. The apparatus of claim 1 wherein said damper means is disposed below said outlet in said upper chamber.

3. The apparatus of claim 2 wherein said outlet in said upper chamber is disposed in the upper portion of said upper chamber.

4. The apparatus of claim 1 wherein
    said separating means includes a tubular filter screen element vertically disposed within said upper chamber whereby said upper chamber defines a plenum surrounding said screen element, said screen element being adapted to communicate at its lower end with said lower collecting chamber through an opening in said upper chamber, and
    said inlet in the upper chamber includes a duct adapted to communicate with the upper end of said screen element through an opening in the top wall of said upper chamber.

5. The apparatus of claim 4 wherein said separating means includes a like plurality of spaced apart, tubular filter screen elements vertically disposed within said upper chamber whereby the latter defines a plenum surrounding said like plurality of filter screen elements, each of said screen elements being adapted to communicate at their lower ends respectively with said lower collection chamber through a series of corresponding openings in said upper chamber, and
    said inlet in the upper portion of the upper chamber includes a plurality of ducts adapted to communicate with the respective upper ends of said like plurality of screen elements through a corresponding series of openings in said upper chamber top wall.

6. The apparatus of claim 4 wherein said lower collecting chamber comprises a bin for storing said separated waste materials, said bin further including an access door for removing said waste materials therefrom.

7. The apparatus of claim 4 wherein said lower collecting chamber comprises a duct extending substantially downwardly relative to said upper plenum chamber whereby under the force of gravity said separated waste materials may be carried through and by said duct to a separate apparatus for reutilization therein.

8. The apparatus of claim 4 wherein said exhaust means further includes means for regulating the rate of flow of said separated air or other gas from said plenum.

9. The apparatus of claim 5 wherein said respective tubular filter screen elements are tapered; the cross-sectional area thereof being greater at the bottom than at the top.

10. A system for separating and collecting waste materials from a moving stream of dust laden gas having said waste materials suspended therein comprising:
- an enclosure having a substantially horizontal partition member fixedly supported therein for dividing the interior of said enclosure into an upper plenum chamber for receiving said stream of dust laden gas and a lower collection chamber for receiving said waste materials,
- a vertically aligned tapered tubular filter screen element disposed substantially centrally within said plenum chamber and being fixedly supported therein between said partition member and the top wall of said enclosure: the cross-sectional area of said screen element being greater at the bottom than at the top,
- an opening in the top wall of said enclosure in registry with the upper end of said tubular filter screen element,
- an intake duct coupled to said top wall opening for feeding said moving stream of dust laden gas into said plenum chamber through said screen element, said intake duct having an angular construction serving to abruptly change the direction of flow of said stream and provide an impact surface for waste material therein,
- said partition member having an opening in registry with the lower end of said tubular screen element whereby said waste materials are urged downwardly under the force of gravity through said opening in said partition member into said lower collection chamber, and
- an exhaust duct communicating with said upper plenum chamber through an opening in the side wall thereof for exhausting only said dust laden gas therefrom, said screen elements and the increasing cross-sectional area thereof permitting lateral outward flow of dust-laden air thus providing a reduction in the velocity of the flow stream and facilitating gravity separation of said waste material therefrom.

11. The system of claim 10 wherein said lower collection chamber comprises a duct extending downwardly and away from said partition member for conveying said waste materials to a separate apparatus for reutilization therein, said duct having a planar filter screen element disposed intermediately therein for defining two parallel conduits extending longitudinally along the interior of said duct, one of said conduits being in registry with the opening in said partition member and therefore in registry with the lower end of said tubular filter screen element, an aperture in said partition member communicating with said plenum chamber, the other of said conduits communicating with said plenum chamber through said aperture whereby any dust laden gas escaping into said first conduit through said opening in said partition member passes through said planar filter screen element, said aperture in said partition member, into said plenum chamber, and out through said exhaust duct, and
- said downwardly extending duct having a plate member for sealing off the lower end of said second conduit whereby only said waste material enters said separate apparatus through said first conduit.

12. The system of claim 11, wherein a damper is located in a side wall of said plenum chamber below said exhaust port for permitting entry of outside air to neutralize any pressure drop between said plenum chamber and collection chamber.

13. The apparatus of claim 10 further comprising an exhaust fan coupled to said exhaust duct,
and a two-way valve connected to the output of said exhaust fan for directing said exhausted flow of dust laden gas through a first output duct in one position thereof and through a second output duct in another position thereof, said first output duct being adapted to carry said dust laden gas to a separate apparatus having provision therein for separating and collecting the dust from said gas, and said second output duct being adapted to carry said dust laden gas to the outside atmosphere.

14. The apparatus of claim 13 further including a damper plate adjustably supported within said exhaust duct for selectively regulating the rate of flow of dust laden gas therethrough.

15. In combination:
- the waste material separator and collector as defined in claim 10 and,
- a dust separator and collector, said dust separator and collector including an input duct for receiving a stream of dust impregnated gas, means for separating said dust from said gas, means for storing said separated dust, and output means for delivering dust free gas wherein,
- said waste material separator and collector exhaust duct is coupled to said dust separator and collector input duct.

16. A waste material separator and collector comprising,
- a casing having its interior divided into an upper plenum chamber and a lower collecting chamber by a partition plate horizontally disposed within said casing substantially intermediately thereof, said casing including: a top wall and a plurality of side walls, a plurality of openings in said top wall, a corresponding series of openings in said partition plate, a plurality of hollow, cylindrical, tapered, spaced apart filter screen elements fixedly supported in vertical alignment within said upper plenum chamber, each hollow filter screen element communicating with one of said openings in said top wall and one of said corresponding openings in said partition plate respectively: the cross-sectional area of said screen elements being greater at the bottom than at the top, an exhaust port located in one of said side walls near said top wall, an exhaust duct having therein an adjustable damper plate connected to said exhaust duct for exhausting the contents of said upper plenum chamber, a plurality of intake ducts connected to said casing top wall in registry with each of said openings therein respectively for delivering a plurality of streams of dust impregnated air having bits and pieces of waste material suspended therein into the upper ends of said respective hollow filter screen elements and whereby said dust impregnated air passes through said screen elements and into said plenum chamber, said escaping dust impregnated air being exhausted through said exhaust port into said exhaust duct by said exhaust fan, said bits and pieces of waste material being trapped in said hollow filter screen elements and falling downwardly therethrough under the force of gravity through said openings in said partition plate and into said collection chamber, a damper located in a side wall of said plenum chamber below said exhaust port for permitting entry of outside air to neutralize any pressure drop between said plenum chamber and collection chamber, said collection chamber comprising a downwardly extending duct for conveying said separated waste materials to a machine for reutilization therein, and said downwardly extending duct further including additional filter screen means for permitting any dust impregnated air escaping into said downwardly extending duct and passing through said additional filter screen means to be exhausted into said plenum chamber and out through said exhaust port in said casing side wall.

* * * * *